(12) United States Patent
Dizchavez

(10) Patent No.: US 6,191,733 B1
(45) Date of Patent: Feb. 20, 2001

(54) TWO-ANTENNA POSITIONING SYSTEM FOR SURFACE-MINE EQUIPMENT

(75) Inventor: Ruben Flores Dizchavez, Tucson, AZ (US)

(73) Assignee: Modular Mining Systems, Inc., Tucson, AZ (US)

( * ) Notice: Under 35 U.S.C. 154(b), the term of this patent shall be extended for 0 days.

(21) Appl. No.: 09/323,190

(22) Filed: Jun. 1, 1999

(51) Int. Cl.[7] .............................. H04B 7/185; G01S 5/02
(52) U.S. Cl. ...................... 342/357.17; 701/215; 37/348
(58) Field of Search ...................... 342/357.17; 701/215; 37/348

(56) References Cited

U.S. PATENT DOCUMENTS

| | | | |
|---|---|---|---|
| 5,404,661 | * | 4/1995 | Sahm et al. .............................. 37/348 |
| 5,438,771 | | 8/1995 | Sahm et al. .............................. 37/348 |
| 5,546,093 | * | 8/1996 | Gudat et al. ............................ 37/414 |
| 5,951,613 | * | 9/1999 | Sahm et al. ............................. 701/50 |
| 6,052,647 | * | 4/2000 | Parkinson et al. .................... 701/215 |

* cited by examiner

Primary Examiner—Theodore M. Blum
(74) Attorney, Agent, or Firm—Antonio R. Durando

(57) ABSTRACT

Two GPS units are mounted at two separate points on the body of a work machine to periodically measure their three-dimensional coordinates with respect to a chosen reference system. As soon as two sets of measurements are recorded, a plane is fitted through the four points so collected and it is used to determined the current orientation of the machine. As each additional set of position data is collected at predetermined intervals for the two points on the machine, a new plane equation is calculated to update the orientation of the machine based on a predetermined number of prior measurements. Standard-deviation analysis is used to check the validity of each plane calculation and the process is restarted when the deviation is found to be greater than an acceptable parameter. Based on the current coordinates of the two GPS antennae, the current orientation plane so calculated, and the known geometry of the work machine, the current position of its critical components can be determined as well irrespective of the specific motion pattern of the machine.

32 Claims, 2 Drawing Sheets

TWO-ANTENNA POSITIONING SYSTEM FOR SURFACE-MINE EQUIPMENT

BACKGROUND OF THE INVENTION

1. Field of the Invention

This invention is related in general to the field of equipment automated control and, in particular, to a system for determining the position and orientation of various components of a work machine operating on the grounds of a surface mine.

2. Description of the Related Art

Surface mines utilize a variety of work machines for excavating and transporting ore, grading and stabilizing roadways and slopes in the mine pit, and providing all support functions necessary to the operation of a mine. Most work machines, such as excavators, shovels, backhoes and the like, are human-operated, mobile pieces of equipment constantly being moved around on the surface of the mine. Skilled operators ensure that each work machine is positioned in the right place and optimally oriented to perform its intended function. For example, an excavator operator will ensure that the undercarriage of the machine is sufficiently close to the minable seam and that its boom is oriented so as to permit the bucket of the machine to reach and extract a full load of ore.

In order to improve safety and efficiency, much effort is currently under way to develop automated systems for controlling the operation of work machines in surface-mine and other environments. The ability to determine the exact position of critical components of a working machine, such as the bucket of an excavator, is a very important feature of any such effort to automate certain aspects of a mining operation. Accordingly, various positioning systems have been developed in this and related arts based on the properties of various triangulation tools such as lasers, radio, microwave, radar, and the Global Position System (GPS).

For example, in U.S. Pat. No. 5,438,771, Sahm et al. describe a system for determining the location and orientation of a work machine having a fixed undercarriage supporting a car body rotatably connected to it. The system utilizes a GPS unit placed on the car body at a place removed from its axis of rotation. By collecting at least three coordinate positions of the GPS antenna as the car body rotates over its stationary undercarriage, the plane corresponding to the orientation of the machine and the position of the axis of rotation can be calculated. Based on these data, the current position of the GPS antenna, and the geometry of the machine, the position and orientation of every critical component of the machine can be determined and used for controlling its operation.

Because of the requirement that at least three positions of the GPS antenna be recorded along an arc of rotation, the system disclosed in the '771 patent is only applicable to work machines that include a rotating body over a transport undercarriage. In addition, the system requires that the undercarriage be kept stationary during measurements and that at least three data points be collected before the plane of orientation can be determined every time the work machine is moved to a new work site. Therefore, this method and apparatus are not suitable for continuous tracking of the position of mine vehicles or for controlling equipment lacking a rotating body. The present invention provides a procedure and apparatus that overcome these deficiencies.

BRIEF SUMMARY OF THE INVENTION

The primary objective of this invention is a method and apparatus for determining the position and orientation of critical components of a work machine operating on the surface of a work site.

Another important goal of the invention is a system of general application to all kinds of equipment, irrespective of their specific geometry and whether or not they include a rotating component.

Another objective is a system that provides continuous position and orientation information while the work machine is stationary as well as when it is moving along the surface of the work site.

Another goal is a system that can be implemented in conjunction with conventional control algorithms and/or hardware.

Still another objective is a system that is suitable for incorporation within existing work-machine instrumentation.

A final objective is a system that can be implemented easily and economically according to the above stated criteria.

Therefore, according to these and other objectives, the preferred embodiment of the present invention consists of utilizing two GPS units judiciously mounted at two separate points on the body of a work machine to periodically measure their three-dimensional coordinates with respect to a chosen reference system. As soon as two sets of measurements are recorded, a plane is fitted through the four points so collected and it is used to determined the current orientation of the machine. As each additional set of position data is collected for the two points on the machine at predetermined intervals, a new plane equation is calculated to update the orientation of the machine based on a predetermined number of prior measurements. Standard-deviation analysis is used to check the validity of each plane calculation and the process is restarted when the deviation is found to be greater than an acceptable parameter. Based on the current coordinates of the two GPS antennae, the current orientation plane so calculated, and the known geometry of the work machine, the current position of its critical components can be determined as well irrespective of the specific motion pattern of the machine.

Various other purposes and advantages of the invention will become clear from its description in the specification that follows and from the novel features particularly pointed out in the appended claims. Therefore, to the accomplishment of the objectives described above, this invention consists of the features hereinafter illustrated in the drawings, fully described in the detailed description of the preferred embodiment and particularly pointed out in the claims. However, such drawings and description disclose but one of the various ways in which the invention may be practiced.

DESCRIPTION OF THE PREFERRED EMBODIMENTS OF THE INVENTION

The present invention consists of a novel two-antenna positioning system and a corresponding computational algorithm for ascertaining the position and orientation of a mobile machine on the surface of a work site, such as the pit of a surface mine. The algorithm is based on the periodic collection of position data for two known points on the body of the machine where positioning apparatus is mounted. Accordingly, the invention requires two positioning-system units dedicated to provide current coordinate data for these two points. The preferred embodiment of the invention utilizes GPS units, but is understood that any other technology capable of determining the three-dimensional position of a selected point on the work machine is suitable for practicing the invention.

Figure 1:
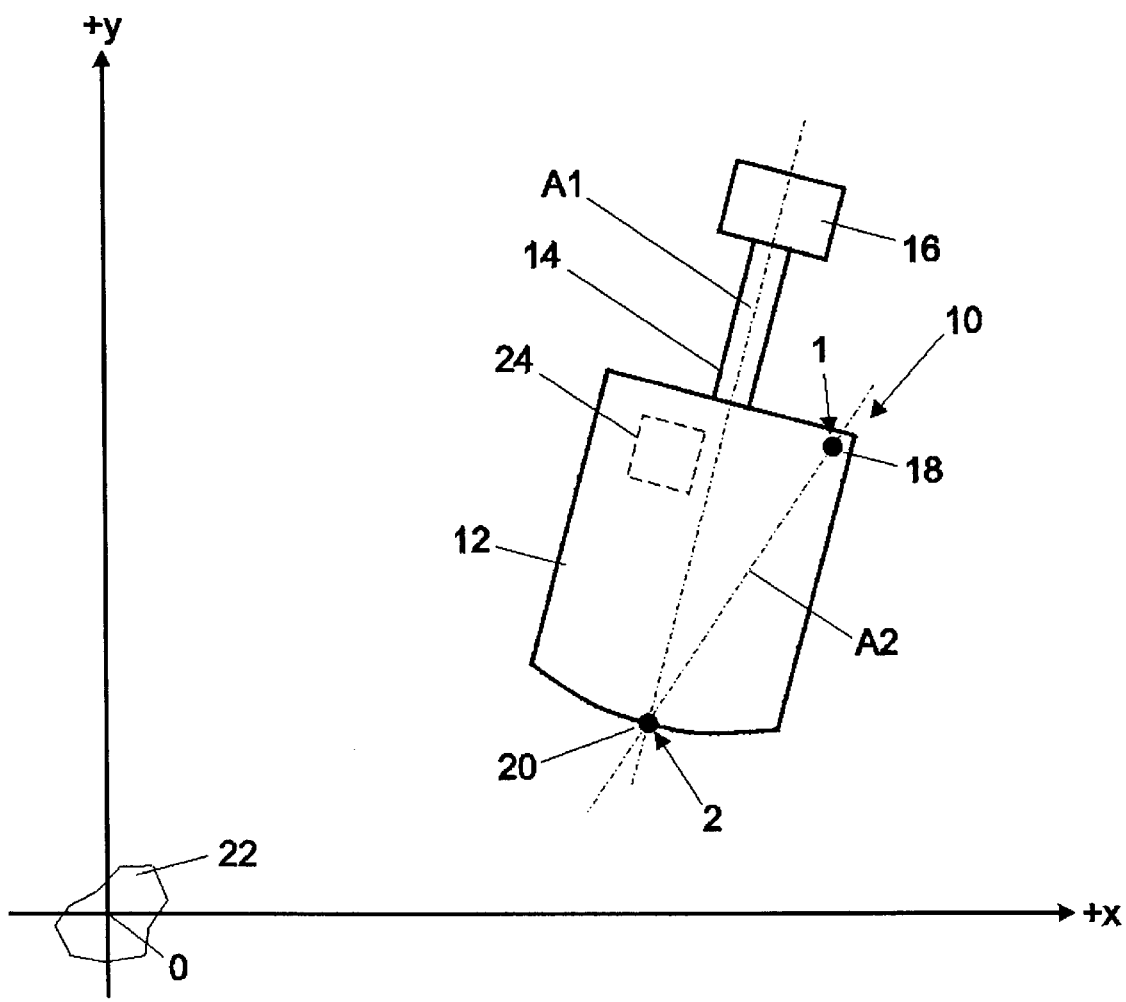
FIG. 1 is a schematic plan view of a conventional excavator illustrating the placement of two GPS units according to the invention.

Referring to the drawings, wherein like parts are designated throughout with like numerals and symbols, FIG. 1 illustrates in plan view a conventional machine 10, such as a shovel-type excavator, used in surface mining operations. Such equipment includes a car body 12 mounted on an undercarriage (not shown) for moving the machine within the work site, an articulated boom 14, and a shovel bucket 16. In order to optimize the production cycle of the machine, it is desirable to keep track of the current location and orientation of some critical component of the excavator, in particular the position of the shovel bucket 16. According to the invention, two GPS units 18 and 20 are rigidly mounted on the car body 12 at two known locations (shown by reference numerals 1 and 2, corresponding to the position of the units 18,20). In order to optimize the accuracy of measurement, the units are preferably separated by as much distance as possible, and in any event by more than twice the resolution of the GPS system. As would be obvious to one skilled in the art, each GPS unit and its antenna needs to be placed at a location on the body 12 where it can be shielded by a protective structure and is less likely to suffer damage from the hardship of normal mining operation. One of the front corners of the car body 12 (shown as point 1 by a reference arrow, where unit 18 is located) and the rearmost point along the main horizontal axis A1 of the machine 10 (point 2, unit 20) are preferred in the case of an excavator-type machine 10.

Using standard GPS operation, the coordinates of points 1 and 2 are determined periodically to locate the machine 10 with reference to a predetermined x,y,z coordinate system (z being the vertical direction) having an origin O appropriately selected for practicing the invention, such as corresponding to a recognizable monument 22 at a mine site. After a first measurement is taken, the exact spatial position of points 1 and 2 is known, but the orientation of the car body 12 remains unresolved because of the infinite positions the car body may assume depending on its degree of rotation around the axis A2 passing through points 1 and 2. Therefore, more information is needed to establish the tilt of the machine 10 with respect to such axis.

As used herein, the term orientation is intended to refer to the pitch and roll of the machine 10 with respect to a known reference plane, such as a horizontal plane, where pitch and roll refer to angular deviations from the x,y axes of the reference plane, respectively, or vice versa. It is also understood that a premise of the invention is that the machine 10 is sufficiently rigid to suffer negligible structural deformation during normal use, so that the location of any component can be determined with confidence once the position of points 1 and 2 and the orientation of the car body 12 is established. As detailed in prior-art disclosures, the determination of the position of any part that is movable with respect to the car body 12 (such as the extendable boom 14 and the bucket 16 pivotally attached to it) must account for such relative movement and change in the overall geometry of the machine. Appropriate devices to measure and keep track of such relative movements, such as linkage position sensors (angle and tilt), are available in the art and the algorithm of the invention has simply to account for such additional three-dimensional displacements using apparatus and procedures that are also well known by those skilled in the art.

According to one aspect of the invention, as the machine 10 moves around the surface of a work site, the position of points 1 and 2 is measured at predetermined time intervals, which may be periodic or not. According to another aspect, a plane equation is fitted by conventional least-squares techniques through a selected number of most recent measurement data points. In the preferred embodiment, we found that 20 such measurement sets provide a suitable data base for estimating the current orientation of the machine 10. Thus, as soon as two sets of data are collected from the GPS units 18,20 (four points in space), a plane equation is fitted through them and its orientation with respect to a horizontal plane is accepted as the orientation of the machine 10. In order to ensure the reliability of each new set of measurements, the standard deviation of the data used to fit the current plane equation is calculated and the equation is rejected if the standard deviation is greater than a predetermined value. In such case, the procedure is restarted and a new plane equation is calculated with the current and next sets of data collected through the GPS units, so that updated position information is skipped for one time interval only.

Thus, after each set of position measurements [$(x_1, y_1, z_1)$ and $(x_2, y_2, z_2)$] for points 1 and 2 is obtained, the system of the invention also determines the corresponding current pitch and roll of the machine with respect to the horizontal plane, based on which the current position of any machine component can be ascertained. Using standard least-squares surface fitting techniques, a plane equation having the general form $z=ax+by+c$ is derived for the plane that best fits the last n sets of position data for the two points 1 and 2, where n is judiciously chosen to provide a computationally efficient algorithm. From basic mathematical principles, it is known that the coefficients a and b of the plane equation represent the slopes of the plane with respect to the x and y axes, respectively; for the purposes of the invention, these slopes are also defined as the pitch and roll of the plane with respect to the horizontal plane $z=0$ passing through the origin 22 of the reference coordinate system selected for locating the machine 10. The orientation of the machine with respect to the horizontal plane is taken to be the same as that of the currently-calculated plane equation. Thus, the last recorded spatial coordinates of the points 1 and 2 and the slope parameters of the current plane equation define the current position of the car body 12 with respect to the reference point 22, such that the location and orientation of the machine within the mine are known and can be used for control and process optimization purposes.

As mentioned, once the position of the car body 12 of the machine 10 is established in space, the machine's geometry and the history of any relative motion of machine components make it possible to determine the current position of any such component of interest, which can then be utilized for improving operating performance. For instance, the position of the shovel 16 can be shown on a monitor that also indicates the location of a target mining site, so that an operator of the excavator 10 need not rely on surface markers to identify ore boundaries. Similarly, the system of the invention could be used to direct the placement of automated haulage equipment within reach of the excavator's bucket for loading after completion of a mining cycle.

Figure 2:
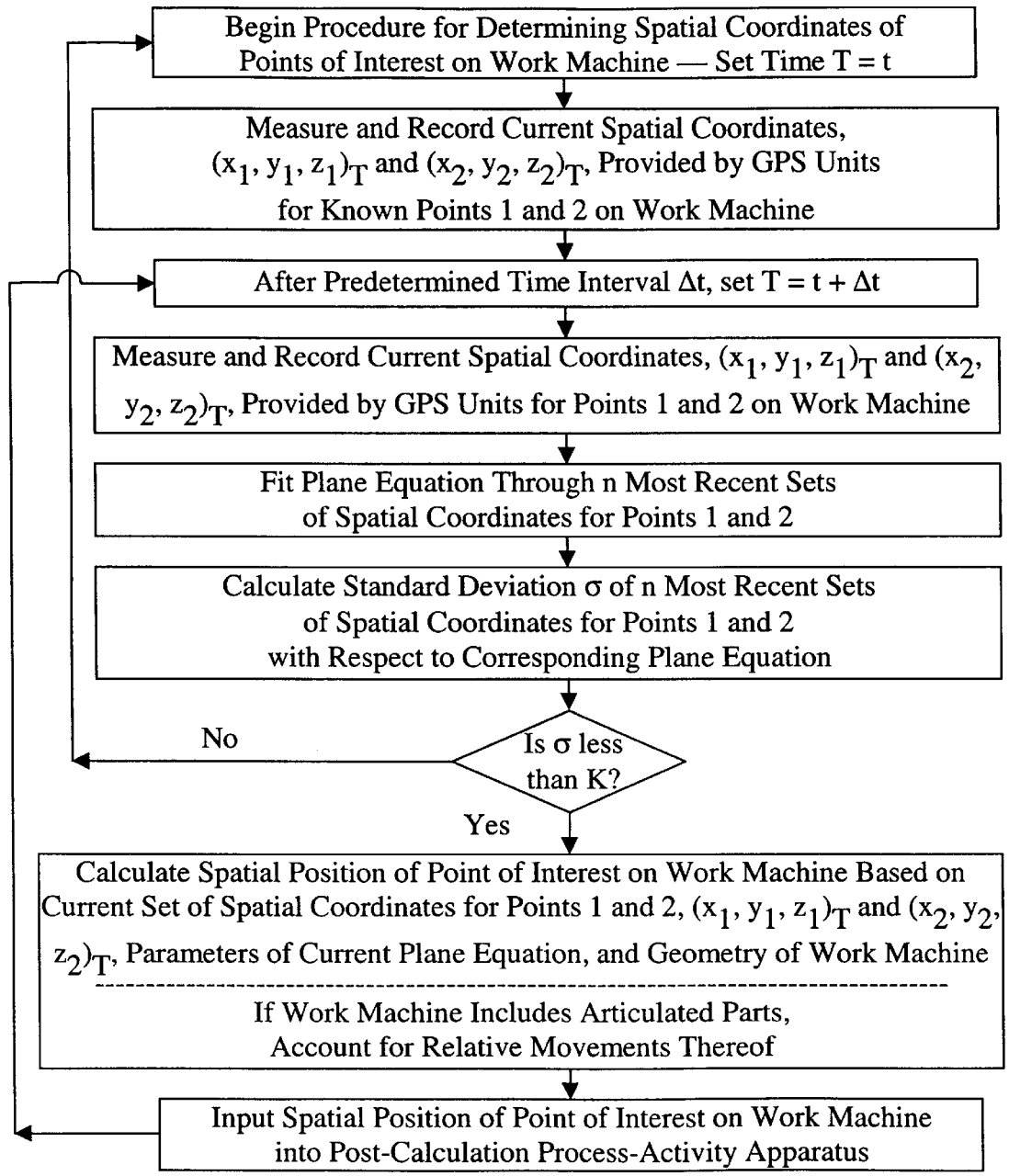
FIG. 2 shows a flow diagram detailing the computational steps of the invention.

FIG. 2 illustrates in flow-diagram form the computational steps of the invention detailed above. Obviously, a data processing system 24 must be provided to enable the computations required to determine the position of the work machine 10 to occur in real time. Such processing system preferably consists of a microprocessor, or a personal computer including a CPU, coupled to a data storage medium and a logic circuit or other programmed component that performs a series of specifically identified operations to implement the procedure of the invention. In the preferred embodiment, the current set of spatial coordinates is recorded periodically from the GPS units at ½- to 2-second intervals; 20 most recent sets of data are retained for the fitting step that produces the current plane equation used to determine the pitch and roll of the machine 10; and a maximum standard deviation σ of 30 cm is tolerated, otherwise the plane fitting routine is restarted. Two GPS units Model No. GG24 manufactured by Ashtech Precision Products (Magellan Corporation) of Santa Clara, Calif., have been used as indicated in FIG. 1 and spaced apart a distance of 15.5 meters. These units provide coordinate information with an average accuracy within 3 cm, which in turn has produced position measurements for the machine 10 with a spatial accuracy of 10 cm and an orientation accuracy within 0.20 degrees of rotation with respect to the axis A2 passing through points 1 and 2.

The advantages of the invention could be obtained as well by using any positioning system capable of providing rapid and accurate three-dimensional coordinate information at predetermined time intervals for any two points on the work machine. Moreover, because the orientation parameters are obtained by fitting a surface equations to coordinate data collected over several periods of time, equivalent results would be obtained by measuring the coordinates of points 1 and 2 at different times; that is, concurrent measurements are not critical to the invention. Similarly, numerical techniques other than least-squares regression could be used to fit the plane equation through the spatial coordinates sequentially identified by the travel trajectory of points 1 and 2. Finally, a surface equation other than that of a plane could also be used to determine the current orientation of the work machine; for example, the equation of a spherical surface. In such case, the pitch and roll parameters of the plane tangent to the sphere at the current position of either point 1 or 2 would yield accurate orientation information for the machine. It is expected that such determination would be even more precise than the information derived simply from the plane equation, but it would not be preferred because of the added computational complications which are not warranted in light of the excellent results obtained with the procedure illustrated above.

The foregoing illustrates that the system of the invention is not dependent on the rotation of the car body 12 or any other component with respect to an undercarriage. Therefore, it is suitable for use with equipment that does not feature such functional characteristic. Moreover, the method of the invention requires only two measurements before current position information is provided and position updates continue to be available at predetermined time intervals whether or not the work machine is traveling within the work site.

It is noted that the invention has been described with reference to x, y and z orthogonal coordinates wherein x and y define a horizontal plane and z defines a vertical direction, but it is obvious that the structure and operation of the features detailed above could be rotated in any direction with equivalent results. Similarly, a different coordinate system could be used, as would be obvious to one skilled in the art. It is also understood that the various components shown in the drawings are not drawn to relative scale, but they are represented only schematically for illustration.

Various changes in the details, steps and components that have been described may be made by those skilled in the art within the principles and scope of the invention herein illustrated and defined in the appended claims. Therefore, while the present invention has been shown and described herein in what is believed to be the most practical and preferred embodiments, it is recognized that departures can be made therefrom within the scope of the invention, which is not to be limited to the details disclosed herein but is to be accorded the full scope of the claims so as to embrace any and all equivalent apparatus and processes.

What is claimed is:

1. A method for determining the spatial location and orientation of a work machine having a known geometry, comprising the following steps:

(a) determining spatial coordinates of a first point on the work machine corresponding to a position along a trajectory traveled by said first point in three-dimensional space;

(b) determining spatial coordinates of a second point on the work machine corresponding to a position along a trajectory traveled by said second point in three-dimensional space;

(c) repeating steps (a) and (b) a predetermined number of times to produce a plurality of said coordinates of the first and second points on the work machine corresponding to successive positions along said trajectories traveled in three-dimensional space;

(d) fitting a surface equation through said plurality of coordinates and determining orientation parameters for the surface equation so produced; and (e) calculating a spatial location and orientation parameters of the work machine utilizing current spatial coordinates for said first and second points on the work machine, the orientation parameters of the surface equation calculated in step (d), and the known geometry of the work machine.

2. The method of claim 1, further including the following step:

(f) successively repeating steps (a), (b), (d) and (e) to determine current coordinates of said first and a second points on the work machine; to produce a current plurality of said coordinates of the first and second points on the work machine based on a predetermined number of most recent measurements; to fit a current surface equation through said current plurality of coordinates; to determine current orientation parameters for the current surface equation so produced in step (d); and to calculate a current spatial location and current orientation parameters of the work machine utilizing current spatial coordinates for the first and second points on the work machine, the current orientation parameters of the surface equation, and the known geometry of the work machine.

3. The method of claim 1, further including the steps of:

calculating a standard deviation for said plurality of coordinates used in step (d);

comparing the standard deviation to a predetermined parameter;

if the standard deviation is smaller than said predetermined parameter, continuing to step (e);

if the standard deviation is equal to or greater than said predetermined parameter, repeating steps (a) and (b) at least once to produce a new plurality of said coordinates of the first and second points on the work machine corresponding to successive positions along said trajectories traveled in three-dimensional space; and continuing with step (d) using said new plurality of coordinates.

4. The method of claim 2, further including the steps of:

calculating a standard deviation for said plurality of coordinates used in step (d);

comparing the standard deviation to a predetermined parameter;

if the standard deviation is smaller than said predetermined parameter, continuing to step (e);

if the standard deviation is equal to or greater than said predetermined parameter, repeating steps (a) and (b) at least once to produce a new plurality of said coordinates of the first and second points on the work machine corresponding to successive positions along said trajectories traveled in three-dimensional space; and continuing with step (d) using said new plurality of coordinates.

5. The method of claim 1, wherein at least one of said steps (a) and (b) is carried out using a global-positioning-system unit.

6. The method of claim 1, wherein said surface equation in step (d) is a plane equation.

7. The method of claim 6, wherein said step (d) is carried out using linear regression.

8. The method of claim 1, wherein said predetermined number of times in step (c) is at least two.

9. The method of claim 2, wherein said predetermined number of most recent measurements is twenty.

10. The method of claim 1, wherein said predetermined parameter is 30 cm.

11. A method for determining the spatial location and orientation of a work machine having a known geometry, comprising the following steps:

(a) determining spatial coordinates of a first point on the work machine corresponding to a position along a trajectory traveled by said first point in three-dimensional space;

(b) determining spatial coordinates of a second point on the work machine corresponding to a position along a trajectory traveled by said second point in three-dimensional space;

(c) repeating steps (a) and (b) a predetermined number of times to produce a plurality of said coordinates of the first and second points on the work machine corresponding to successive positions along said trajectories traveled in three-dimensional space;

(d) fitting a surface equation through said plurality of coordinates and determining orientation parameters for the surface equation so produced; and (e) calculating a spatial location and orientation parameters of the work machine utilizing current spatial coordinates for said first and second points on the work machine, the orientation parameters of the surface equation calculated in step (d), and the known geometry of the work machine;

wherein said step (d) is carried out using linear regression.

12. The method of claim 11, further including the following step:

(f) successively repeating steps (a), (b), (d) and (e) to determine current coordinates of said first and a second points on the work machine; to produce a current plurality of said coordinates of the first and second points on the work machine based on a predetermined number of most recent measurements; to fit a current surface equation through said current plurality of coordinates; to determine current orientation parameters for the current surface equation so produced in step (d); and to calculate a current spatial location and current orientation parameters of the work machine utilizing current spatial coordinates for the first and second points on the work machine, the current orientation parameters of the surface equation, and the known geometry of the work machine.

13. The method of claim 11, further including the steps of:

calculating a standard deviation for said plurality of coordinates used in step (d);

comparing the standard deviation to a predetermined parameter;

if the standard deviation is smaller than said predetermined parameter, continuing to step (e);

if the standard deviation is equal to or greater than said predetermined parameter, repeating steps (a) and (b) at least once to produce a new plurality of said coordinates of the first and second points on the work machine corresponding to successive positions along said trajectories traveled in three-dimensional space; and continuing with step (d) using said new plurality of coordinates.

14. The method of claim 12, further including the steps of:

calculating a standard deviation for said plurality of coordinates used in step (d);

comparing the standard deviation to a predetermined parameter;

if the standard deviation is smaller than said predetermined parameter, continuing to step (e);

if the standard deviation is equal to or greater than said predetermined parameter, repeating steps (a) and (b) at least once to produce a new plurality of said coordinates of the first and second points on the work machine corresponding to successive positions along said trajectories traveled in three-dimensional space; and continuing with step (d) using said new plurality of coordinates.

15. The method of claim 11, wherein at least one of said steps (a) and (b) is carried out using a global-positioning-system unit.

16. The method of claim 11, wherein said surface equation in step (d) is a plane equation.

17. The method of claim 11, wherein said predetermined number of times in step (c) is at least two.

18. The method of claim 12, wherein said predetermined number of most recent measurements is twenty.

19. The method of claim 11, wherein said predetermined parameter is 30 cm.

20. A method for determining the spatial location and orientation of a work machine having a known geometry, comprising:

(a) determining a plurality of coordinates of a first point on the work machine corresponding to successive positions along a trajectory traveled by said first point in three-dimensional space;

(b) determining a plurality of coordinates of a second point on the work machine corresponding to successive positions along a trajectory traveled by said second point in three-dimensional space;

(c) fitting a surface equation through said plurality of coordinates determined in steps (a) and (b); and (d) calculating a spatial location and orientation parameters of the work machine on the basis of current coordinates of said first and second points on the work machine, orientation parameters of said surface equation, and said known geometry of the work machine.

21. The method of claim 20, wherein at least one of said steps (a) and (b) is carried out using a global-positioning-system unit.

22. The method of claim 20, wherein said surface equation in step (c) is a plane equation.

23. A method for determining the spatial location and orientation of a work machine having a known geometry, comprising:

(a) determining a plurality of coordinates of a first point on the work machine corresponding to successive positions along a trajectory traveled by said first point in three-dimensional space;

(b) determining a plurality of coordinates of a second point on the work machine corresponding to successive positions along a trajectory traveled by said second point in three-dimensional space;

(c) fitting a surface equation through said plurality of coordinates determined in steps (a) and (b); and (d) calculating a spatial location and orientation parameters of the work machine on the basis of current coordinates of said first and second points on the work machine, orientation parameters of said surface equation, and said known geometry of the work machine;

wherein said step (c) is carried out using linear regression.

24. The method of claim 23, wherein at least one of said steps (a) and (b) is carried out using a global-positioning-system unit.

25. The method of claim 23, wherein said surface equation in step (c) is a plane equation.

26. An apparatus for determining the spatial location and orientation of a work machine having a known geometry, comprising:

first means for determining position coordinates of a first point on the work machine in three-dimensional space at successive times corresponding to successive positions along a travel trajectory of said first point;

second means for determining position coordinates of a second point on the work machine in three-dimensional space at successive times corresponding to successive positions along a travel trajectory of said second point;

means for storing a plurality of said position coordinates of the first and second points on the work machine;

means for fitting a surface equation through said plurality of position coordinates of the first and second points on the work machine and for determining orientation parameters for said surface equation; and means for calculating a spatial location and orientation of the work machine utilizing a current set of position coordinates for said first and second points on the work machine, the orientation parameters corresponding to a current surface equation, and the known geometry of the work machine.

27. The apparatus of claim 26, wherein at least one of said first and second means for determining position coordinates includes a global-positioning-system unit.

28. The apparatus of claim 26, wherein said surface equation is a plane equation.

29. An apparatus for determining the spatial location and orientation of a work machine having a known geometry, comprising:

first means for determining position coordinates of a first point on the work machine in three-dimensional space at successive times corresponding to successive positions along a travel trajectory of said first point;

second means for determining position coordinates of a second point on the work machine in three-dimensional space at successive times corresponding to susccessive positions along a travel trajectory of said second point;

means for storing a plurality of said position coordinates of the first and second points on the work machine;

means for fitting a surface equation through said plurality of position coordinates of the first and second points on the work machine and for determining orientation parameters for said surface equation; and means for calculating a spatial location and orientation of the work machine utilizing a current set of position coordinates for said first and second points on the work machine, the orientation parameters corresponding to a current surface equation, and the known geometry of the work machine;

wherein said means for fitting a surface equation includes means for implementing linear regression on said plurality of position coordinates.

30. The apparatus of claim 29, wherein said surface equation is a plane equation.

31. The apparatus of claim 29, wherein at least one of said first and second means for determining position coordinates includes a global-positioning-system unit.

32. The apparatus of claim 29, wherein said surface equation is a plane equation.

* * * * *